United States Patent [19]

Brenner et al.

[11] Patent Number: 4,671,694
[45] Date of Patent: Jun. 9, 1987

[54] ELASTIC ARTICULATION, COUPLING, OR THE LIKE

[75] Inventors: Heinz Brenner; Bruno Hüsch, both of Bad Neuenahr-Ahrweiler; Erwin Gollub, Neuss, all of Fed. Rep. of Germany

[73] Assignees: BOGE GmbH; TRW Ehrenreich GmbH & CO KG, Düsseldorf, both of Fed. Rep. of Germany

[21] Appl. No.: 738,777

[22] Filed: May 29, 1985

[30] Foreign Application Priority Data

May 29, 1984 [DE] Fed. Rep. of Germany ....... 3419967

[51] Int. Cl.⁴ ............................................. F16B 1/00
[52] U.S. Cl. ................................... 403/226; 403/227; 403/228
[58] Field of Search ............... 403/228, 226, 227, 225

[56] References Cited

U.S. PATENT DOCUMENTS

| | | | |
|---|---|---|---|
| 1,555,214 | 9/1925 | Johnson . | |
| 1,911,866 | 5/1933 | Wylie | 403/224 X |
| 1,952,115 | 3/1934 | Borst | 267/54 |
| 1,983,796 | 12/1934 | Geyer | 403/226 |
| 2,207,059 | 7/1940 | Herring | 280/33.9 |
| 2,472,029 | 5/1949 | Thiry | 248/358 |
| 2,705,643 | 4/1955 | Green | 279/96 |
| 3,165,065 | 1/1965 | Stickel | 103/117 |
| 4,420,274 | 12/1983 | Husch | 403/227 |

FOREIGN PATENT DOCUMENTS

| | | |
|---|---|---|
| 6606532 | 10/1970 | Fed. Rep. of Germany . |
| 3004075 | 8/1981 | Fed. Rep. of Germany . |
| 651134 | 3/1951 | United Kingdom ............. 403/227 |
| 892577 | 3/1962 | United Kingdom . |

Primary Examiner—Andrew V. Kundrat
Attorney, Agent, or Firm—Nils H. Ljungman

[57] ABSTRACT

The invention provides an elastic articulated coupling which comprises a relatively rigid inner member having a longitudinal axis, a relatively rigid outer member having a generally cylindrical interior of a predetermined first diameter surrounding said inner member with substantial clearance, and an elastomeric body located in the clearance between the inner and outer members. The elastomeric body is connected firmly to the inner member. Additionally, a sleeve comprising wear-resistant elastic material is firmly connected to the elastomeric body and disposed between the elastomeric body and the outer member. The elastomeric body and the sleeve together have a predetermined second diameter which is greater than the predetermined first diameter defined by the interior of the generally cylindrical outer member. As a result, the sleeve is connected in a non-positive manner with the interior surface of the outer member merely by radial pre-stressing and by axial bracing.

11 Claims, 2 Drawing Figures

Fig. 1
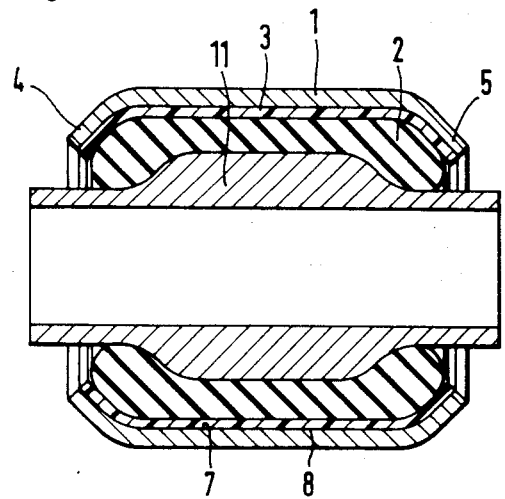
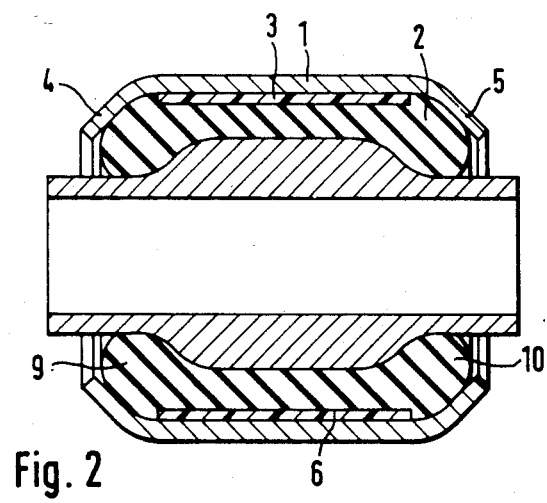
Fig. 2

ELASTIC ARTICULATION, COUPLING, OR THE LIKE

BACKGROUND OF THE INVENTION

1. Field of the Invention:

This invention generally relates to elastic joints or couplings which are used wherever high radial loads occur at excessive twist angles, such as in transverse control linkages, tilted shaft control linkages, axle struts, spring bearings, link brackets, etc., on, for example, cars, trucks, buses and even rail vehicles. More particularly, this invention relates to an elastic articulation, coupling, or the like, with a metallic inner part, such as a ball or cylindrical sleeve, disposed in an elastomeric body formed of rubber or similar material joined thereto, and in turn being enclosed by a generally cylindrical metallic outer part, such as a cylindrical sleeve, being joined therewith solely by friction through the axial clamping of a pair of annular metallic parts on the end faces of the elastomeric body. On the outer peripheral surface of the elastomeric body, means are additionally provided to enhance the frictional adherence between the outer cylindrical part and the elastomeric body.

2. Description of the Prior Art:

An elastic articulation of the type as generally referred to above is known from German Utility Model No. DE-GM 66 06 532 in which the interior portion forming the rubber-metal part is inserted with the elastic rubber body into the exterior portion and is held within that outer portion by axial bracing. In these conventional joints, structural features are typically located on the outside circumferential surface of the elastic rubber body in order to increase the contact friction between the elastic rubber body and the outer cylindrical member. Typically, techniques used to increase this friction comprise grooves which run axially or circumferentially thereabout. The depth of these grooves is up to one-third the thickness of the rubber. With this technique, when the rubber is compressed, it is also displaced so as to be perpendicular to the grooves. When the grooves are appropriately configured, a more favorable and uniform distribution of compression stress is achieved, therefore resulting in an improvement of the contact friction between the rubber body and the exterior metal portion. However, it has been found that these structural arrangements in known elastic articulations have not invariably led to an adequate increase in frictional adherence. When there is strong axial stressing in clamping of the annular parts, the frictional adherence facilitates only a limited angle of rotation of the elastic articulation. When the maximum permissible angle of rotation is exceeded, the rubber body in the outer part, suffers pronounced abrasion. Accordingly, the known elastic articulations are believed to lack adequate fatigue strength, functional reliability, or desired life expectancy in line with modern requirements. It should also be appreciated, because of the grooves disposed in the elastomeric body that extend relatively deep into the rubber, that there are disadvantageous notching stress peaks in the known elastic joints.

The above identified difficulties are specifically addressed in German Patent Publication Published For Opposition Purposes No. DE-OS 30 04 075, which corresponds to U.S. Pat. No. 4,420,274, which is incorporated herein by reference. This reference cites U.S. Pat. Nos. 3,165,065; 2,705,643; 2,472,029; 2,207,059; and 1,952,115, which are also incorporated herein by reference. This reference, U.S. Pat. No. 4,420,274, teaches an improvement in which a fabric of solid material, preferably metal wire, is imbedded in the peripheral surface of the elastomeric body, with the fabric wire mesh running generally diagonally to the longitudinal access of the coupling, such that the fabric, together with the elastomeric body, are axially compressed and clamped. The fabric, with its meshes running essentially diagonally to the direction of pre-stressing, is yieldable in diameter upon axial compression in camping, such that the fabric advantageously moves uniformly into the metallic outer part. While the surface of the elastic rubber body is thereby strengthened and service life is significantly increased, problems have been encountered with placement in the vulcanizing mold due to the instability of the wire mesh. In addition, further problems arise during manufacture as a result of the fact that the two axial compression discs must be placed in the mold by means of magnets, so that after the vulcanizing mold is closed, it is extremely difficult to maintain important tolerances of the compression discs. Thus, the danger of defects and damage in the end product increases. In addition, after the insertion into the metal exterior portion, only a linear contact exists. This is due to the fact that the wires are laid crosswise on top of one another. After a corresponding length of time in service, wear is caused by the linear contacts, so that ultimately the wire mesh breaks and the joint fails. In addition to the service life difficulties encountered with the joint described in the above-identified U.S. Patent, the manufacture of such a joint requires that appropriate lock washers or locking rings be used to secure the axial compression discs.

OBJECT OF THE INVENTION

It is, therefore, an object of this invention to provide a simple and effective joint, coupling, etc., which can be stressed radially and axially and which is compact and easy to install. Additionally, cardanic excursions in the range of between about 10 to 15 degrees can be executed without any problems, as can twist angles which are greater than the thrust angle of the rubber body. As a result, a significant improvement in the service life of the joint or coupling is achieved, configured according to this invention.

SUMMARY OF THE INVENTION

The invention provides an elastic articulated coupling which comprises a relatively rigid inner member having a longitudinal axis, a relatively rigid outer member having a generally cylindrical interior of a predetermined first diameter surrounding said inner member with substantial clearance, and an elastomeric body located in the clearance between the inner and outer members. The elastomeric body is connected firmly to the inner member. Additionally, a sleeve comprising wear-resistant elastic material is firmly connected to the elastomeric body and disposed between the elastomeric body and the outer member. The elastomeric body and the sleeve together have a predetermined second diameter which is greater than the predetermined first diameter defined by the interior of the generally cylindrical outer member. As a result, the sleeve is connected in a non-positive manner with the interior surface of the outer member merely by radial pre-stressing and by axial bracing. Because there is a non-positive connection between the sleeve and the metal exterior portion, which is due to the radial and axial bracing and the co-efficient of friction therebetween, twisting angles greater than the thrust angle allowed for the rubber body alone can be executed by controlled sliding. The controlled sliding of the sleeve together with the interior portion is also permitted if the interior surface of the metal exterior portion and/or the exterior surface of the sleeve is provided with a permanent lubricant or a friction reducing coating, whereby there are recesses, partial indentations, or similar facilities for the permanent lubricant.

BRIEF DESCRIPTION OF THE DRAWINGS

The above, as well as other features and advantages of the present invention, can be appreciated through consideration of the detailed description of the invention in conjunction with the several drawings, in which:

FIG. 1 shows an elevational, cross-sectional view of an elastic joint incorporating the teachings of this invention; and FIG. 2 shows an elevational, cross-sectional view of an alternative embodiment of an elastic joint, all according to the teachings of this invention.

DESCRIPTION OF THE PREFERRED EMBODIMENTS

A first embodiment of the elastic turning articulation is illustrated in FIG. 1 and includes a metal interior portion 11, with which an elastic rubber body 2 is firmly connected by vulcanization. The elastic rubber body 2 is surrounded by an essentially cylindrical metal exterior portion 1 and is connected by friction contact with the latter by radial and axial bracing of the end regions 4 and 5. In order to improve the service life of the exterior circumferential surface of the elastic body 2, there is a sleeve 3 made of material with high resistance to abrasion. This sleeve 3 is flexible and is firmly connected with the elastic rubber body 2 by vulcanizing. According to the first embodiment of this invention, in order to optimize the advantages of this embodiment, the sleeve 3 extends over the entire circumferential surface of the elastic rubber body 2.

The sleeve 3 is placed, together with the elastic rubber body 2, in the metal exterior portion 1, which has a smaller inside diameter than that of the combined outside diameter defined by the elastic rubber body 2 and the sleeve 3, vulcanized thereto, when the elastic rubber body 2 and the sleeve 3 are not compressed. Because the metal exterior portion 1 has a smaller diameter, radial force is produced by compression of the sleeve 3 and the elastic rubber body 2. In addition, the end regions 4 and 5 are deformed by rolling or crimping. As a result of the axial bracing, another radial force component is produced.

In order to be able to absorb the twisting stress within acceptable parameters, either the interior surface 7 of the metal exterior portion 1, or the exterior surface 8 of the sleeve 3, or both, can be provided with a permanent lubricant or with friction-reducing coatings. A twisting stress, during which high thrust angles occur because of the small rubber cross-section, is thereby avoided.

An alternative embodiment of the elastic joint described above in connection with FIG. 1 is shown in FIG. 2, in which like components are identified with like reference characters. In the alternative embodiment shown in FIG. 2, the sleeve 3 is located over only a portion of the elastic rubber body 2, and is also embedded in the surface 6 of the elastic rubber body 2. In other words, the elastic rubber body 2 is of a first length and the sleeve 3 is of a second length, shorter than the first length. The elastic rubber body 2 has a center portion of a lesser diameter, adapted to receive therein the sleeve 3, so that when assembled, the combined elastic rubber body 2 and sleeve 3 have a substantially constant diameter along the total length thereof.

As should be readily appreciated, all other elements of this invention described in association with FIG. 1, as well as the additional preferred features described in connection therewith, can be applied to the alternative embodiment of FIG. 2.

One of the advantages which should be appreciated in connection with both the embodiments of FIGS. 1 and 2, is that a compact construction is possible without additional axial compression discs and locking rings. As a result, the elastic joint of this invention is economical, easy to manufacture, install and remove. Due to the use of the sleeve 3, which has a relatively smooth exterior surface, a very good bracing can be achieved. This bracing is a result of the fact that the elastic rubber body 2 is placed together with the sleeve 3, with a radial prestressing, in the metal exterior portion. In other words, the prestressing is produced by the metal exterior portion, since the inside diameter of that metal exterior portion is less than that of the elastic rubber body together with the sleeve. In addition, another radial force is then produced by axial bracing, that is, the crimping of the edges, so that the desired non-positive connection can be achieved.

The sleeve 3 can be made of a plastic material which is then connected with the elastic rubber body 2 by vulcanizing. The advantage lies in the fact that not only does this provide a flexible material with a high degree of wear resistance, but the fixed connection with the elastic rubber body 2 can also be produced by vulcanizing.

While crimping is not necessary, an embodiment without additional compression discs and locking rings is achieved by the use of crimping. This crimping consists of deforming radially inwardly the end regions of the metal exterior portion. As described above, the sleeve can extend over the entire surface of the elastic rubber body 2, or over a substantial portion thereof while resting in a portion of the elastomeric material which is of a lesser diameter than the remaining portion thereof. When the interior portion is sealed off by the deformation or crimping of the end regions of the metal exterior portion and the end regions of the elastic rubber body, an additional advantageous result occurs. Dirt cannot penetrate from the outside of the elastic joint, since the crimping of the exterior portion provides a constant axial prestress. Another advantage with regard to installation is achieved as a result of the fact that such a joint can be installed in one receptacle without additional axial securing, and can easily be replaced if repairs are necessary.

What has been described is an elastic joint or coupling of the type used wherever high radial loads occur at excessive twist angles, such as in transverse controlling hinges, tilted shaft control linkages, axle struts, spring bearings, link brackets, etc.

The invention as described hereinabove in the context of the preferred embodiments is not to be taken as limited to all of the provided details thereof, since modifications and variations thereof may be made without departing from the spirit and scope of the invention.

What is claimed is:

1. An elastic articulated coupling comprising:
   a relatively rigid inner member having a longitudinal axis;
   a relatively rigid outer member including end regions and having a generally cylindrical interior surface of a predetermined first diameter surrounding said inner member with substantial clearance therebetween and wherein said interior surface of said relatively rigid outer member includes means in which a lubricant is disposed, said means being chosen from a member of a group consisting of: recesses and partial indentations;
   an elastomeric body located in the clearance between said inner and outer members, said elastomeric body being connected firmly to said inner member; and
   a sleeve, comprising a wear-resistant elastic material firmly connected to said elastomeric body, being disposed between said elastomeric body and said outer member and connected in a non-positive manner therewith, said sleeve having an exterior surface, wherein said elastomeric body and said sleeve are of a predetermined second diameter which is greater than said predetermined first diameter, wherein said sleeve is connected in a non-positive manner with said outer member by pre-stressing having a radial component, and wherein said end regions of said relatively rigid outer member extend radially inwardly and, as a result, at least axially pre-stress said elastomeric body.

2. An elastic articulated coupling comprising:
   a relatively rigid inner member having a longitudinal axis;
   a relatively rigid outer member including end regions and having a generally cylindrical interior surface of a predetermined first diameter surrounding said inner member with substantial clearance therebetween;
   an elastic body of a first length, having a central portion of a reduced diameter with respect to the remaining portion of said elastic body, being located in the clearance between said inner and outer members, said elastic body being connected firmly to said inner member; and
   a sleeve, having a second length which is less than said first length, and adapted to be received in said reduced-diameter central portion of said elastic body, wherein said sleeve is embedded in the surface of said elastic body, and comprises a wear-resistance elastic material firmly connected to said elastic body, said sleeve being disposed between said elastic body and said outer member and connected in a non-positive manner therewith, said sleeve having an exterior surface, wherein said elastic body and said sleeve are of a predetermined second diameter which is greater than said predetermined first diameter, wherein said sleeve is connected in a non-positive manner with said outer member by pre-stressing having a radial component, and wherein said end regions of said relatively rigid outer member extend radially inwardly and, as a result, at least axially pre-stress said elastic body.

3. The elastic articulated coupling according to claim 2 wherein said sleeve is made of a plastic material and is connected with said elastic body by means of vulcanization.

4. The elastic articulated coupling according to claim 2 including a lubricant chosen from a member of a group consisting of: a permanent lubricant and a lubricating coating, said lubricant being disposed between said sleeve and said generally cylindrical interior surface of said relatively rigid outer member.

5. The elastic articulated coupling according to claim 4 wherein said lubricant is disposed on said exterior surface of said sleeve.

6. The elastic articulated coupling according to claim 4 wherein said lubricant is disposed on said generally cylindrical interior surface of said relatively rigid outer member.

7. The elastic articulated coupling according to claim 5 wherein said sleeve includes means in which said lubricant is disposed, said means being chosen from a member of a group consisting of: recesses and partial indentations.

8. The elastic articulated coupling according to claim 6 wherein said interior surface of said relatively rigid outer member includes means in which said lubricant is disposed, said means being chosen from a member of a group consisting of: recesses and partial indentations.

9. The elastic articulated coupling according to claim 2, wherein a seal is formed between said inwardly extending metal exterior portion of said end regions of said relatively rigid outer member and said end regions of said elastic body.

10. An elastic aritculated coupling comprising:
    a relatively rigid inner member having a longitudinal axis;
    a relatively rigid outer member having a generally cylindrical interior surface of a predetermined first diameter surrounding said inner member with substantial clearance therebetween;
    an elastomeric body located in the clearance between said inner and outer members, said elastomeric body being connected firmly to said inner member; and
    a sleeve, comprising a wear-resistant elastic material firmly connected to said elastomeric body, being diposed between said elastomeric body and said outer member and connected in a non-positive manner therewith, said sleeve having an exterior surface, wherein said elastomeric body and said sleeve are of a predetermined second diameter which is greater than said predetermined first diameter, wherein said sleeve is connected in a non-positive manner with said outer member by pre-stressing having a radial component, and wherein said relatively rigid outer member interior surface includes means being chosen from a group consisting of recesses and partial indentations in which a lubricant chosen from a group consisting of a permanent lubricant and a lubricating coating is disposed between said sleeve and said generally cylindrical interior surface of said relatively rigid outer member.

11. An elastic articulated coupling comprising:
    a relatively rigid inner member having a longitudinal axis;
    a relatively rigid outer member having a generally cylindrical interior surface of a predetermined first diameter surrounding said inner member with substantial clearance therebetween;
    an elastic body of a first length, having a central portion of reduced diameter with respect to the remaining portion of said elastic body, being locating in the clearance between said inner and outer member, said elastic body being connected firmly to said inner member; and a sleeve, having a second length which is less than said first length, and adpated to be received in said reduced-diameter central portion of said elastic body, wherein said sleeve is embEdded in the surface of said elastic body, and comprises a wear-resistant elastic material firmly connected to said elastic body, said sleeve being disposed between said elastic body and said outer member and connected in a non-positive manner therewith, said sleeve having an exterior surface, wherein said elastic body and said sleeve are of a predetermined second diameter which is greater than said predetermine first diameter, wherein said sleeve is connected in a non-positive manner with said outer member by pre-stressing having radial component, and wherein said relatively rigid outer member interior surface includes means being chosen from a group consisting of recesses and partial indentations in which means a lubricant chosen from a group consisting of a permanent lubricant and a lubricant coating is disposed between said sleeve and aid generally cylindrical interior surface of said relatively rigid outer member.

* * * * *